Aug. 7, 1951 V. A. LARSEN 2,563,252
VEHICLE WINDOW WEATHER STRIP
Filed Dec. 17, 1949 2 Sheets-Sheet 1
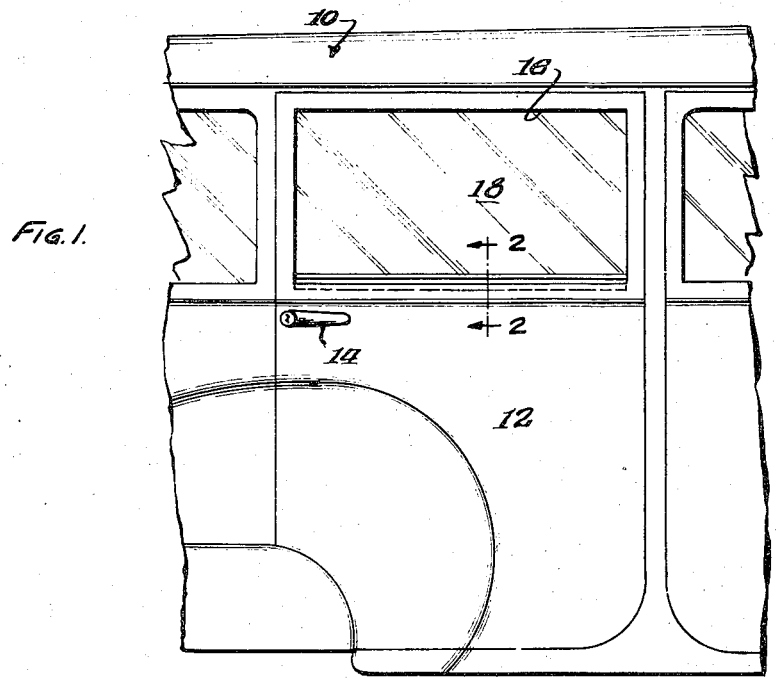
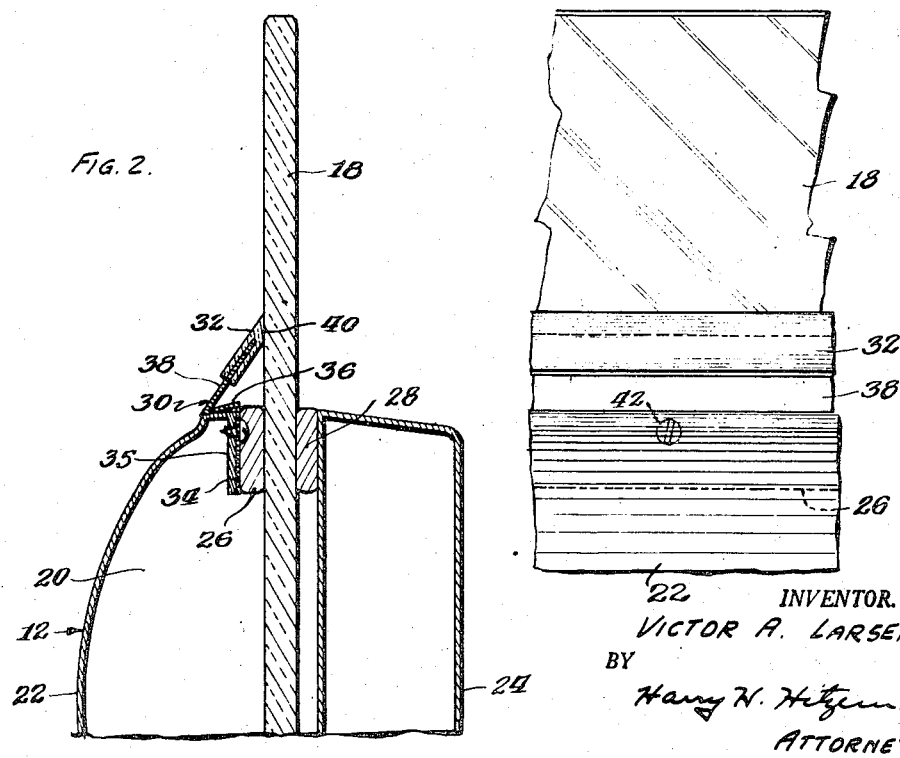
INVENTOR.
VICTOR A. LARSEN
BY
Harry N. Hitzeman
ATTORNEY Aug. 7, 1951  V. A. LARSEN  2,563,252
VEHICLE WINDOW WEATHER STRIP
Filed Dec. 17, 1949  2 Sheets-Sheet 2
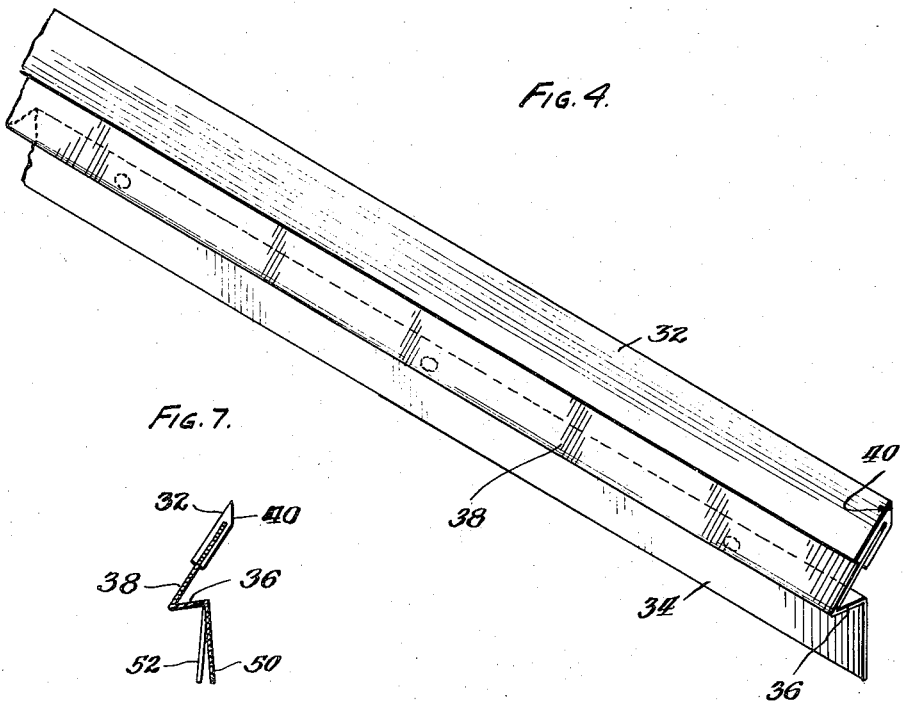
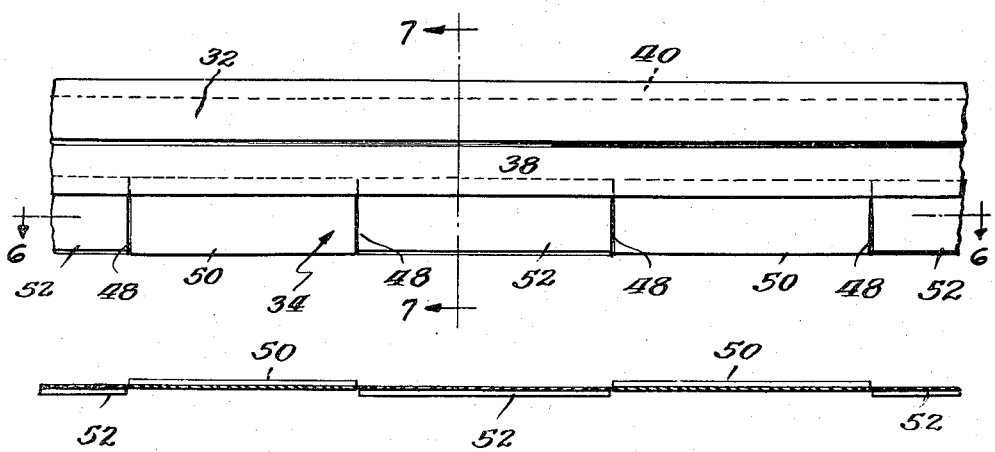
INVENTOR.
VICTOR A. LARSEN
BY
Harry H. Hilgeman
ATTORNEY Patented Aug. 7, 1951

2,563,252

UNITED STATES PATENT OFFICE 2,563,252

VEHICLE WINDOW WEATHER STRIP

Victor A. Larsen, Chicago, Ill.

Application December 17, 1949, Serial No. 133,586

2 Claims. (Cl. 20—69)

My invention relates to improvements in vehicle window weather strips.

My invention relates more particularly to weather strip means for use in connection with movable window panes of vehicle windows such as the windows in the doors of automobiles which are capable of being moved open and shut, the window strip being adapted to be secured to the door frame adjacent the lower end of the window opening to prevent moisture from entering the door at the window pane.

Weather strips of the type which I propose are adapted to be fastened upon the door frame of automobiles and other vehicles adjacent the window frame for the purpose of preventing moisture from entering the door along the window panes. As is well known to those familiar with automobile construction, several types of automobiles now on the market have doors so constructed that any moisture which enters the door frame at the window glass is trapped within the door, thereby causing rust and deterioration inside of the door.

The principal object of the present invention is to provide a window weather strip for automotive vehicles which may be either standard equipment and built in on the door frame at the time of manufacture or capable of attachment thereto in an easy and simple manner so that the weather strip is secured adjacent the window glass to prevent moisture from entering the door along the window glass.

A further object of the invention is to provide a weather strip construction for the purpose described which is capable of easy and simple attachment to any and all types of automotive vehicle door windows.

A further object of the invention is to provide a weather strip of the type described capable of being fastened in position against the window glass so that as the windows are raised and lowered it effects a cleaning action upon the glass and cleans the same when the window is manipulated up and down.

Other objects and advantages will be more apparent from the following description wherein reference is had to the accompanying two sheets of drawings, upon which Fig. 1 is a fragmentary side elevational view of an automotive vehicle showing one of the car doors;

Fig. 2 is a full size cross-sectional view thereof taken on the line 2—2 of Fig. 1, with the window in a partially lowered position;

Fig. 3 is a fragmentary side elevational view of the parts shown in Fig. 2;

Fig. 4 is a front perspective view of my improved vehicle window weather strip before application;

Fig. 5 is a side elevational view of a modified construction thereof wherein the same is frictionally held in position;

Fig. 6 is a cross-sectional view thereof taken on the line 6—6 of Fig. 5; and

Fig. 7 is a vertical cross-sectional view taken on the line 7—7 of Fig. 5.

In the embodiment of the invention which I have chosen to illustrate and describe the same, I have shown in Fig. 1 an automotive vehicle 10 which may include a door member 12 having the usual handle 14 and a window frame 16 within which a window pane 18 is mounted. The window pane 18 is mounted in the usual way so that it may be raised or lowered by rotating a handle, pushing a button or other mechanism capable of actuation on the inside of the car.

As shown in Fig. 2, the lower edge of the window pane 18 descends into a well 20 within the metal door frame 12, the door normally including an outer door panel 22, an inner door panel 24 and window guides or channel members 26 and 28.

The improved weather strip which I have provided includes a metal sheet member 30 and a rubber tip member 32. The sheet is preferably aluminum or bronze of approximately .010 thickness, and is formed with the retaining wall portion 34, the ledge 36 and the tip holding arm 38. The rubber tip is preferably synthetic rubber of the type which may be molded directly over the extended edge of the arm 38, the tip preferably having a flat glass surface engaging portion 40.

To fasten the window strip in position several different methods may be employed. In the preferred embodiment shown in Figs. 1 to 3, I have provided screw members 42 which may be fastened through the retaining wall portion 34 at spaced intervals and engage the down-turned ledge 35 of the outer door panel 22.

With the window weather strip in position as shown in Figs. 1 to 3, it will be obvious that through the resiliency of the arm 38, the tip 32 will be held in a sealing position against the outer surface of the window pane 18. Thus when it is raining, snowing, or other moisture is in the air, the frictional grip of the rubber tip against the outer surface of the window pane will effectively prevent any moisture from reaching the inside of the door 12.

When the outside of the window pane 18 becomes dirty or smeared, water may be poured against the window and the window rolled up and down a few times to effect a thorough cleaning of the same.

Another feature of the construction resides in the fact that due to the spring tension of the arm 38, rattling of the window is prevented which is sometimes caused by looseness of the window pane in the sills or guides 26 and 28.

In the modified form of the invention which I have shown in Figs. 5 to 7, it will be noted that the retaining wall portion 34 has vertical slits 48 at spaced intervals, with alternate sections 50 (see Fig. 6) bent to the right, and opposite sections 52 bent to the left. Thus with a spring material, the weather strip can be frictionally held in position adjacent the guides 26 and 28, and will be maintained in this position due to the frictional grip of the alternately bent portions of the retaining wall.

It will be understood that the weather strip may be applied to all four sides of car windows if desired, and may be employed with other types of windows where it is desired to raise and lower the window pane. By chromium plating the retaining arm 38, it can be seen that a highly decorative strip can be added to the windows of cars, thus aiding in the appearance of the automobile.

While I have illustrated and described a specific embodiment of the invention it will be apparent to those skilled in the art that changes and modifications may be made in the exact details shown and I do not wish to be limited in any particular; rather what I desire to secure and protect by Letters Patent of the United States is:

1. The combination with a vertically slidable window pane and a sill member adapted to receive the window pane when lowered of a weather strip member mounted on said sill, said member having a retaining wall portion, an offset shoulder, an arm extending diagonally upwardly therefrom and a rubber tip connected over the edge of said arm, said tip adapted to frictionally engage the surface of said window pane, said rubber tip having a flattened surface engaging edge.

2. The combination with a vertically slidable window pane and a sill member adapted to receive the window pane when lowered, of a weather strip member mounted on said sill, said member having a retaining wall portion, an offset shoulder, an arm extending diagonally upwardly therefrom and a rubber tip connected over the edge of said arm, said tip adapted to frictionally engage the surface of said window pane, said rubber tip having a flattened surface engaging edge, said surface engaging edge of the rubber tip being substantially in the vertical plane of the said retaining wall portion and being resiliently held against the surface of said window pane.

VICTOR A. LARSEN.

REFERENCES CITED

The following references are of record in the file of this patent:

UNITED STATES PATENTS

| Number | Name | Date |
| --- | --- | --- |
| 1,473,310 | Nicholson | Nov. 6, 1923 |
| 1,996,635 | Axe | Apr. 2, 1935 |
| 2,260,527 | Klein | Oct. 28, 1941 |